US012480836B2

(12) United States Patent
Andreasen et al.

(10) Patent No.: US 12,480,836 B2
(45) Date of Patent: Nov. 25, 2025

(54) ARTIFICIAL INTELLIGENCE VEHICLE LEAK DETECTION SYSTEM AND RELATED METHODOLOGY

(71) Applicant: INNOVA ELECTRONICS CORPORATION, Irvine, CA (US)

(72) Inventors: Keith Andreasen, Garden Grove, CA (US); Phuong Pham, Fountain Valley, CA (US)

(73) Assignee: INNOVA ELECTRONICS CORPORATION, Irvine, CA (US)

( * ) Notice: Subject to any disclaimer, the term of this patent is extended or adjusted under 35 U.S.C. 154(b) by 0 days.

(21) Appl. No.: 18/431,427

(22) Filed: Feb. 2, 2024

(65) Prior Publication Data

US 2024/0175778 A1 May 30, 2024

Related U.S. Application Data

(63) Continuation of application No. 17/572,463, filed on Jan. 10, 2022, now abandoned.

(51) Int. Cl.
| | | |
|---|---|---|
| *G06T 7/70* | (2017.01) | |
| *G01M 3/38* | (2006.01) | |
| *G06K 7/14* | (2006.01) | |
| *G06Q 30/0601* | (2023.01) | |
| *G06T 7/00* | (2017.01) | |
| *G06V 10/75* | (2022.01) | |
| *G07C 5/08* | (2006.01) | |
| *H04N 23/56* | (2023.01) | |
| *G07C 5/00* | (2006.01) | |

(52) U.S. Cl.
CPC ............. *G01M 3/38* (2013.01); *G06K 7/1413* (2013.01); *G06Q 30/0601* (2013.01); *G06T 7/0002* (2013.01); *G06T 7/70* (2017.01); *G06V 10/751* (2022.01); *G07C 5/0808* (2013.01); *H04N 23/56* (2023.01); *G06V 2201/08* (2022.01); *G07C 5/008* (2013.01); *G07C 2205/02* (2013.01)

(58) Field of Classification Search
None
See application file for complete search history.

(56) References Cited

U.S. PATENT DOCUMENTS

| | | | |
|---|---|---|---|
| 6,647,761 B2 | 11/2003 | Barjesteh | |
| 6,791,088 B1 | 9/2004 | Williams et al. | |
| 8,019,503 B2 | 9/2011 | Andreasen et al. | |
| 8,478,480 B2 | 7/2013 | Mian et al. | |

(Continued)

*Primary Examiner* — Samuel D Fereja
(74) *Attorney, Agent, or Firm* — Stetina Garred Brucker & Newboles

(57) ABSTRACT

A leak detection system is configured to provide vehicle-specific leak detection for a vehicle. The leak detection system includes a memory circuit having a plurality of leak detection instructions matched with vehicle identification information. The system additionally includes an ultraviolet light source and a camera configured to capture an image of an area illuminated by the ultraviolet light source. A processor is in operative communication with the memory circuit and the camera. The processor is configured to facilitate identification of at least one of the plurality of leak detection instructions in response to receipt of vehicle identification information associated with the vehicle, and compare the image captured by the camera to a known image of the vehicle to determine presence and location of a leak.

42 Claims, 5 Drawing Sheets

(56) References Cited

U.S. PATENT DOCUMENTS

| | | |
|---|---|---|
| 9,183,681 B2 | 11/2015 | Fish |
| 9,646,432 B2 | 5/2017 | Madison et al. |
| 10,038,843 B2 | 7/2018 | Kitagawa |
| 10,337,949 B2 | 7/2019 | Augusto |
| 2003/0098425 A1 | 5/2003 | Sosinsky |
| 2004/0168505 A1 | 9/2004 | Dudley |
| 2011/0283777 A1 | 11/2011 | Chrissis |
| 2014/0288761 A1 | 9/2014 | Butler et al. |
| 2015/0028209 A1 | 1/2015 | Harju et al. |
| 2015/0081163 A1 | 3/2015 | Molenkamp et al. |
| 2018/0259418 A1 | 9/2018 | Dudek |
| 2019/0019356 A1 | 1/2019 | Liu et al. |
| 2020/0104989 A1* | 4/2020 | Kennedy ............... G01M 3/002 |
| 2020/0158592 A1* | 5/2020 | Sivarkkamani ....... G01M 3/002 |
| 2020/0242859 A1 | 7/2020 | Merg et al. |
| 2020/0242860 A1 | 7/2020 | Merg et al. |
| 2020/0410781 A1* | 12/2020 | Saini ...................... G07C 5/008 |
| 2021/0008957 A1* | 1/2021 | Francis ................... G01D 5/26 |

\* cited by examiner

SYMPTOM DATABASE

| VIN 1 XXXXXXX1 | LEAK SYMPTOM 1 - 1 | LOCATION 1 - 1 |
|---|---|---|
| | LEAK SYMPTOM 1 - 2 | LOCATION 1 - 2 |
| | LEAK SYMPTOM 1 - N | LOCATION 1 - N |

| VIN 2 XXXXXXX2 | LEAK SYMPTOM 1 - 1 | LOCATION 1 - 1 |
|---|---|---|
| | LEAK SYMPTOM 1 - 2 | LOCATION 1 - 2 |
| | LEAK SYMPTOM 1 - N | LOCATION 1 - N |

VEHICLE IMAGE DATABASE

| VIN 1<br>XXXXXXX1 | FLUID IMAGE | 1 - 1 |
| | FLUID IMAGE | 1 - 2 |
| | FLUID IMAGE | 1 - 3 |
| | FLUID IMAGE | 1 - N |

| VIN 2<br>XXXXXXX2 | FLUID IMAGE | 1 - 1 |
| | FLUID IMAGE | 1 - 2 |
| | FLUID IMAGE | 1 - 3 |
| | FLUID IMAGE | 1 - N |

⋮

| VIN N<br>XXXXXXXN | FLUID IMAGE | 1 - 1 |
| | FLUID IMAGE | 1 - 2 |
| | FLUID IMAGE | 1 - 3 |
| | FLUID IMAGE | 1 - N |

FIG. 5

ARTIFICIAL INTELLIGENCE VEHICLE LEAK DETECTION SYSTEM AND RELATED METHODOLOGY

CROSS-REFERENCE TO RELATED APPLICATIONS

Not Applicable

STATEMENT RE: FEDERALLY SPONSORED RESEARCH/DEVELOPMENT

Not Applicable

BACKGROUND

1. Technical Field

The present disclosure relates generally to leak detection in fluid systems on vehicles, and more specifically, to a leak detection system and a related methodology which utilizes artificial intelligence to detect possible leaks in a fluid system on a vehicle.

2. Description of the Related Art

Vehicles typically include several fluid systems, with each fluid system being associated with a different vehicle function. For instance, a radiator fluid system may serve the function of keeping the engine from overheating. A transmission fluid system may be included to keep the transmission lubricated. Other fluids on the vehicle may include oil, power steering fluid, brake fluid, air conditioning coolant, washer fluid, and fuel, with each fluid typically being associated with a respective fluid system. Each fluid system may include one or more conduits or fluid components which may leak if the integrity of the fluid components is compromised. For instance, a rupture of a tube or a disconnection of a fitting, may result in a leak of the fluid flowing through that component.

Given the importance of the fluid systems, any leak in the fluid system may negatively impact the operation of the vehicle. As such, there is a desire to be able to detect the presence of a leak and identify the component requiring repair or replacement to fix the leak. To that end, several leak detecting tools have been developed for aiding a user in detecting a leak on a vehicle.

Many existing leak detecting tools utilize ultraviolet (UV) light to detect leaks by injecting a UV dye into a system under test. If leaks are present, the dye leaks from the fluid system and UV light may be emitted onto the dye, which causes the dye to illuminate to indicate the presence and location of the leak. Although existing leak detection tools may provide some assistance in detecting leaks, a challenge with using conventional UV-based detection techniques in automobiles is that fluid components, hoses, pipes, etc., are installed in extremely tight places, thereby creating difficulties in viewing the leaking dye.

Furthermore, another deficiency with conventional UV-based leak detection techniques is that even if a leak is capable of being visually detected by a user, the part from which the UV dye is leaking may not be known to the user. As such, the user may not know which part to purchase for replacement. This may be particularly difficult for do-it-yourselfers, who may lack automotive expertise.

Yet another deficiency associated with convention leak detection tools is that they may be limited in their ability to provide guidance to the user. With several different fluid systems on the vehicle, a user may not know where to begin leak testing or how to begin leak testing. Furthermore, the number and location of fluid systems on each vehicle may be unique, and thus, general knowledge of vehicle fluid systems may not be sufficient to easily conduct leak detection. Rather, more vehicle-specific guidance may be needed to quickly and easily conduct leak detection.

Accordingly, there is a need in the art for a leak detection tool capable of providing vehicle-specific guidance, and automatically identifying a leak based on images captured by the tool. Various aspects of the present disclosure address this particular need, as will be discussed in more detail below.

BRIEF SUMMARY

Various aspects of the present disclosure are directed toward addressing the problem of leak detection in tight spaces by utilizing vehicle-specific guidance and artificial intelligence (AI) to analyze images captured by a probe to determine whether a leak may be present. A leak detection tool may guide a user through step-by-step diagnostic instructions, including instructions for injecting dye into a system, and using the probe having a camera and ultraviolet light embedded thereon. The probe is guided by the user to capture images of the system under test, with the images being sent to an image analyzer to detect leaking dye. When dye is detected, the tool may generate a visual alert, audible alert, or send a text message to a user. The alert may identify where the leak is located, as well as parts or repairs that may need to be completed to fix the leak.

In accordance with one embodiment of the present disclosure, there is provided a leak detection system configured to provide vehicle-specific leak detection for a vehicle. The leak detection system includes a memory circuit having a plurality of leak detection instructions and engine layout information matched with vehicle identification information. The vehicle identification information may be input to the system in various ways, such as manual input to the system, scanned from information displayed on a door panel/dashboard of the vehicle or derived from electronic information output from the vehicle on-board diagnostic system. The engine layout information preferably indicates the size, shape and relative location of engine components, in sufficient detail to facilitate identification of specific components disposed within the field of view of the camera. The system additionally includes an ultraviolet light source and a camera configured to capture an image of an area illuminated by the ultraviolet light source. A processor is in operative communication with the memory circuit, the camera and a user interface. The processor is configured to facilitate identification of at least one of the plurality of leak detection instructions in response to receipt of vehicle identification information associated with the vehicle. The processor may be further operative to autonomously analyze the image captured by the camera to detect presence of a leak based on illumination of the area by the ultraviolet light source, and to compare the captured image to the stored engine layout information associated with the vehicle to determine location of the detected leak.

The processor may additionally be operative to autonomously identify the vehicle specific part needing replacement from the location of the leak, the vehicle identification information and the engine layout information. The processor may be configured to generate a part identification signal associated with the part requiring replacement for communication to the user. In one embodiment the part identification signal may be representative of a universal part number, such as an ACES part number. The identification of the part requiring replacement and generation of the associated part identification signal may be implemented autonomously in response to detection of the leak. In one embodiment the part identification signal may be communicated autonomously to a wireless communication device, such as a cellphone, operative to access a part supplier to enable purchase of the part needed to be replaced.

The leak detection system may include a vehicle image database operatively communicable with the processor and having a plurality of vehicle images matched with vehicle identification information. The processor may be configured to identify at least one of the plurality of vehicle images matched with received vehicle identification associated with the vehicle. The leak detection system may include a housing, with the memory circuit and the processor being located within the housing and the vehicle image database being located external to the housing.

The processor may be configured to generate a vehicle identification signal associated with received vehicle identification information. The vehicle identification signal may be communicable to a remote server including a vehicle image database thereon having a plurality of vehicle images matched with vehicle identification information.

The leak detection system may additionally include a hand-holdable housing, with the processor and the memory circuit being located within the housing. A diagnostic connector head may be coupled to the housing, with the diagnostic connector head having a diagnostic connector configured to be plug connectable to a diagnostic port on a vehicle. The ultraviolet light source and the camera may be located on the diagnostic connector head. The leak detection system may also include a display connected to the housing. The display may be in communication with the processor and may be configured to display the at least one of the plurality of leak detection instructions identified in response to receipt of the vehicle identification information associated with the particular vehicle. The display may be in operative communication with the camera and may be configured to display the image captured by the camera.

The leak detection system may include a hand-holdable housing connected to the ultraviolet light source and the camera, with the memory circuit and the processor being located external to the housing. The leak detection system may include communication circuit in the housing and configured to facilitate communications with the memory circuit and the processor.

The memory circuit may include a plurality of leak symptoms and associated leak locations matched with vehicle identification information. The processor may be configured to facilitate identification of at least one of the plurality of leak symptoms in response to receipt of vehicle identification information associated with the particular vehicle.

According to another embodiment, there is provide a method of vehicle-specific leak detection for a vehicle. The method includes receiving vehicle identification information associated with a particular vehicle, and identifying at least one of a plurality of leak detection instructions in response to receipt of the vehicle identification information. The method further includes generating a signal including the identified at least one of the plurality of leak detection instructions. An image of an area illuminated by an ultraviolet light source is received and is analyzed to detect presence of a leak based on illumination of the area captured in the image by the ultraviolet light source. The received image is compared to a known image of the vehicle to determine location of a leak.

The steps of receiving vehicle identification information, identifying, generating, receiving the image, and analyzing all may be performed within a hand-holdable housing.

The step of receiving vehicle identification information may include receiving the vehicle identification information from an onboard vehicle computer. The step of receiving vehicle identification information may include receiving a signal associated with a scan of a barcode located on the vehicle. The step of receiving vehicle identification information may include receiving user input from a user.

The generating step may include generating a visual display including the identified at least one of the plurality of leak detection instructions. The generating step may include generating an audio signal including the identified at least one of the plurality of leak detection instructions.

The method may additionally include emitting an ultraviolet light to facilitate detection of a possible leak.

The method may further comprise the step of receiving symptomatic leak data from a user.

The method may also include comparing the received symptomatic leak data to stored leak symptoms to identify a possible leak.

According to another embodiment, there is provided a non-transitory computer readable medium storing computer executable instructions for use in providing vehicle-specific leak detection for a vehicle. The computer readable medium is configured for use with a memory circuit having a plurality of leak detection instructions matched with vehicle identification information, and a camera configured to capture an image of an area illuminated by an ultraviolet light source. The computer executable instructions are downloadable onto a mobile communication device for configuring the mobile communication device to: facilitate identification of at least one of the plurality of leak detection instructions in the memory circuit in response to receipt of vehicle identification information associated with the vehicle; analyze the image captured by the camera to detect presence of a leak based on illumination of the area captured in the image by the ultraviolet light source; and compare the image captured by the camera to a known image of the vehicle to determine location of the detected leak.

The present disclosure will be best understood by reference to the following detailed description when read in conjunction with the accompanying drawings.

BRIEF DESCRIPTION OF THE DRAWINGS

These and other features and advantages of the various embodiments disclosed herein will be better understood with respect to the following description and drawings, in which:

FIG. 4 is an exemplary symptom database;

FIG. 5 is an exemplary vehicle image database; and

Common reference numerals are used throughout the drawings and the detailed description to indicate the same elements.

DETAILED DESCRIPTION

The detailed description set forth below in connection with the appended drawings is intended as a description of certain embodiments of a vehicle leak detection system and related methodology and is not intended to represent the only forms that may be developed or utilized. The description sets forth the various structure and/or functions in connection with the illustrated embodiments, but it is to be understood, however, that the same or equivalent structure and/or functions may be accomplished by different embodiments that are also intended to be encompassed within the scope of the present disclosure. It is further understood that the use of relational terms such as first and second, and the like are used solely to distinguish one entity from another without necessarily requiring or implying any actual such relationship or order between such entities.

Figure 1:
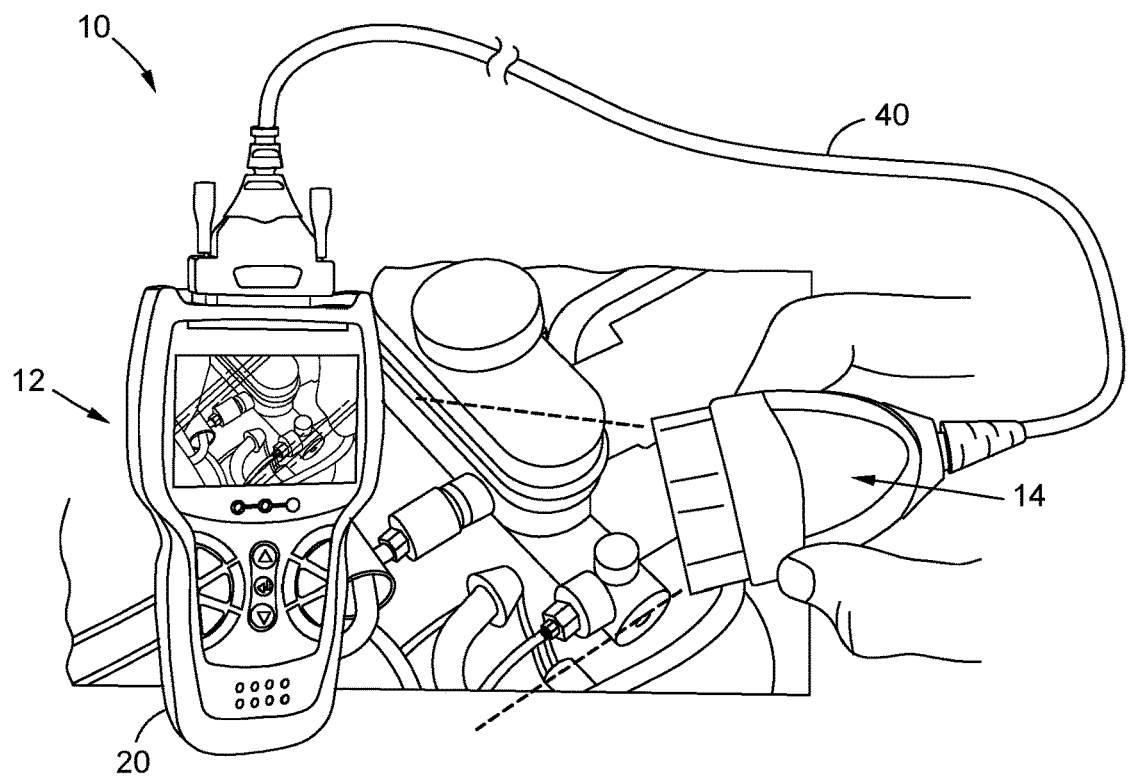
FIG. 1 is an upper perspective view illustrating use of a handheld diagnostic tool for performing leak detection on a vehicle.
Figure 2:
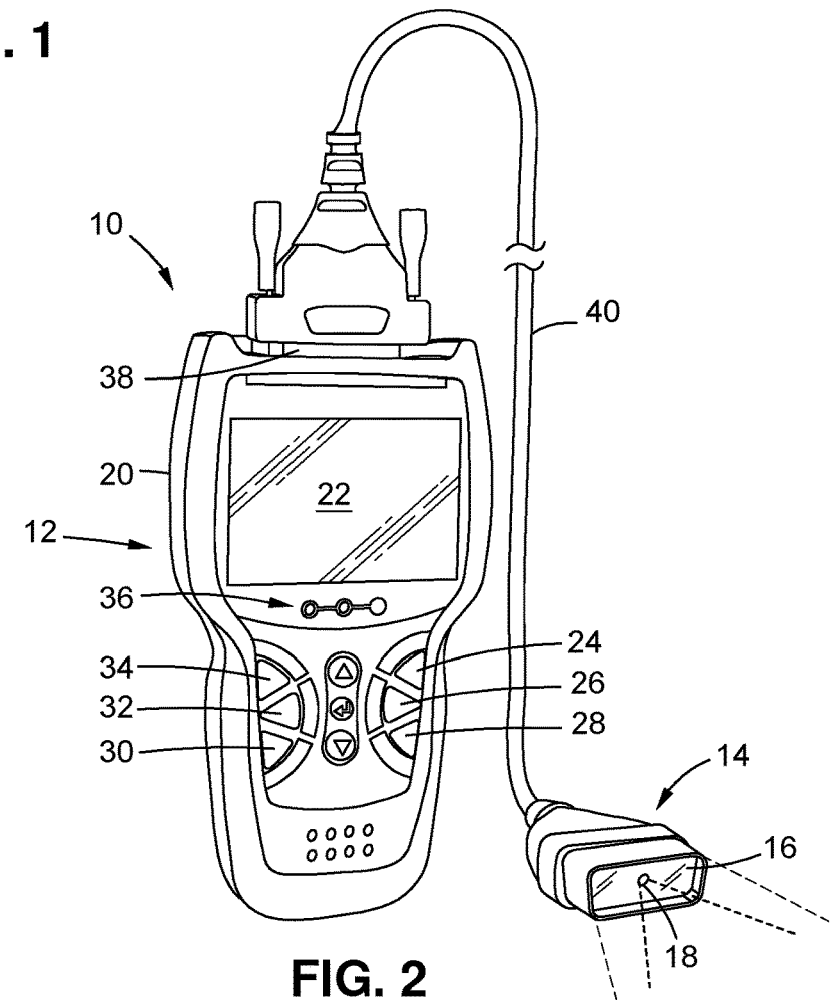
FIG. 2 is an upper perspective view of the handheld diagnostic tool depicted in FIG. 1.

Referring now to the drawings, wherein the showings are for purposes of illustrating a preferred embodiment of the present disclosure, and are not for purposes of limiting the same, there is depicted a handholdable tool 10 capable of conducting leak detection on a vehicle using artificial intelligence (AI). FIG. 1 depicts an exemplary use of the tool 10 for conducting leak detection on a vehicle, while FIG. 2 shows the tool 10 by itself. The tool 10 may include a main unit 12 and a cable head 14 having an ultraviolet (UV) light source 16 and a camera 18 integrated therein. The tool 10 may be configured to provide vehicle specific, step-by-step instructions to guide a user through a leak detection procedure using the tool 10. The procedure may include the use of an UV reactive dye that may be injected into a fluid system under test. The camera 18 may be aimed by a user to capture images/videos of the fluid system under test. An image analyzer may analyze the captured images to detect the presence of leaking dye, which would be indicative of a leak. The analysis may include a comparison of the captured image with stored digital images of the fluid system under test to determine the precise location of the leak, should a leak be detected, as well as to identify the parts that may be leaking, and thus which may require replacement. The tool 10 may further be configured to facilitate purchasing of any replacement parts, as well as scheduling of any repair procedure for fixing the leak.

The use of the tool 10 allows for possible detection of leaks in tight locations that may not be easily viewable by a user. Furthermore, the ability of the analyzer to detect the location of the leak and the parts associated with the leak allows for use by users that do not possess expertise in vehicle fluid systems. Rather, almost any adult user may be capable of operating the tool 10 to identify possible leaks on the vehicle.

According to one embodiment, the tool 10 may include a housing 20 sized and configured to be hand holdable by a user, and may be similar in configuration to conventional scan tools or code readers known in the art. Thus, the tool 10 may include, but may not be limited to, the aforementioned scan tools or code readers, as well as other diagnostic tools, such as diagnostic tablets. It is also contemplated that the tool 10 may include several conventional diagnostic components that work in concert with each other to implement the functionalities described herein. For instance, the tool 10 may include a diagnostic dongle, a camera, and a smartphone, all being in communication with each other (e.g., Bluetooth™ communication) to conduct the leak detection described herein. In other embodiments, it is possible that the tool 10 includes a camera and any general-purpose computing device in communication with the camera and capable of processing the images/videos captured by the camera, as described in more detail below. It is contemplated that the general-purpose computing device may not be handholdable and may include a larger form factor (e.g., a conventional desktop computer or one or more servers in communication with the camera).

A digital display 22 may be incorporated into the tool 10 to display information, pictures, videos, etc., during use of the tool 10. One or more buttons may be incorporated into the tool 10 to allow for user input. For instance, the buttons may include a POWER-LINK button 24, which when pressed, may power own the tool 10 and/or may initiate a communication link with an external computer, such as a vehicle computer, a remote diagnostic server, or a user's smartphone. A MENU button 26 may be actuated to display a digital menu on the display 22. A LIVE DATA button 28 may be actuated to request live data from a vehicle to which the tool 10 may be operatively connected. A DT CODES—FREEZE FRAME button 30 may be actuated to request diagnostic trouble codes (DTCs) and/or live data from the vehicle to which the tool 10 may be operatively connected. A SYSTEM STATUS button 32 may be actuated to display the status of the systems on the vehicle with which the tool 10 may communicate An ERASE button 34 may be actuated to erase data that may be highlighted or selected on the tool's display. The buttons may also include an UP arrow, a DOWN arrow, and a select/enter arrow to facilitate navigation of information displayed on the display screen 22.

The tool 10 may also include one or more external LEDs 36 or lights, which may illuminate to provide a quick diagnostic summary to the user. For instance, a green LED may be indicative of a positive conclusion (e.g., no leak detected), a yellow LED may be indicative of a cautionary conclusion (e.g., possible leak detected or inconclusive conclusion), and a red LED may be indicative of a negative conclusion (e.g., leak detected).

Figure 3:
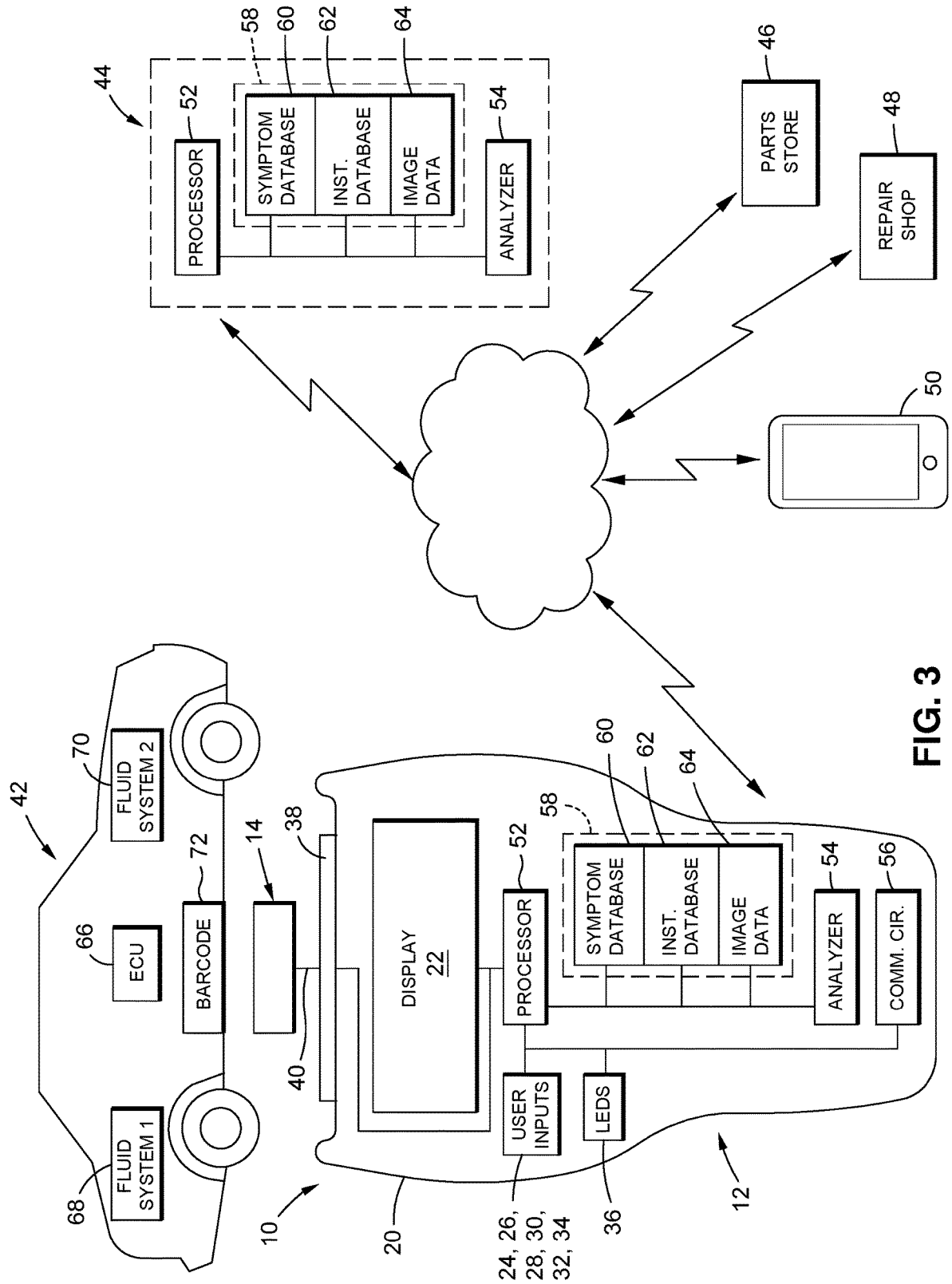
FIG. 3 is a schematic of a leak detection system utilizing the handheld diagnostic tool of FIGS. 1 and 2.
Figure 6:
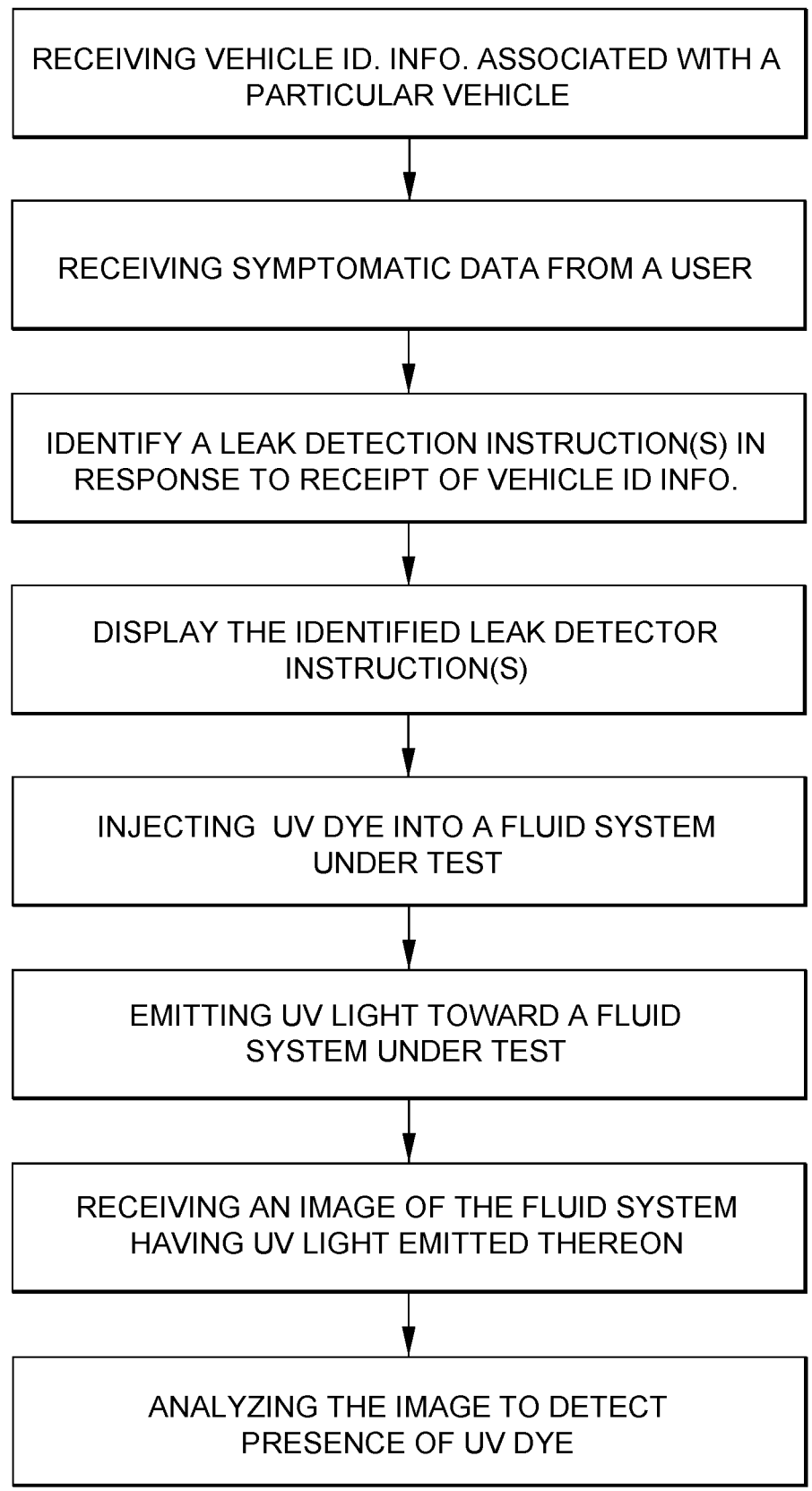
FIG. 6 is a flow chart of an exemplary method of detecting a leak on a vehicle.

The tool 10 may include an external communication port 38 connectable to a cable 40 having the cable head 14 on one end. The connection between the external communication port 38 and the cable 40 may be via a pin connector, or other electrical connections known in the art. The cable 40 may be configured for use in a first operational mode to conduct active leak detection on the vehicle, which may entail the use of a UV light source 16 and camera 18 integrated into the cable head 14. The cable head 14 may also be configured for use in a second operational mode, wherein the cable head 14 is connectable to a diagnostic port on a vehicle to facilitate data communication between the tool 10 and the vehicle. In this regard, the cable head 14 may be configured similar to an OBD-II diagnostic connector. The data communication between the tool 10 and the vehicle may be Referring now to FIG. 3, there is depicted a system-level schematic diagram showing the tool 10 and various components that the tool 10 may be in communication with, including a vehicle 42, a remote server 44, a parts store 46, a repair shop 48, and a user's smartphone 50. FIG. 3 additionally shows several electrical components that may be housed within an internal compartment of the housing 20 of the tool 10. Those components may include a processor 52, an image analyzer 54, a communication circuit 56, and a memory circuit 58 having one or more databases stored thereon, such as a symptomatic database 60, an instructions database 62, and a fluid images database 64. FIG. 3 additionally shows the communication port 38, cable 40 and cable head 14, along with the user input (e.g., buttons 24-34) and LEDs 36.

The vehicle 42 includes an electronic control unit (ECU) 66, along with several fluid systems 68, 70, and a barcode 72 associated with vehicle identification information. The fluid systems 68, 70 may include the power steering fluid system, the radiator fluid system, the washer fluid system, the power steering fluid system, the transmission fluid system, the air conditioning fluid system, etc. The camera 18 on the cable head 14 may be capable of scanning the barcode 72 to retrieve vehicle identification information therefrom. For instance, many vehicles 42 include a barcode 72 located in the door jamb or door panel. The camera 18 on the cable head 14 may also be used to scan the barcode 72, which may be communicated to the processor 52 for decoding to determine the associate vehicle identification information, such as year, make, model, engine, etc. The decoding resources (e.g., hardware and software) may be located within the tool 10 or external to the tool 10. Although the exemplary embodiment shows a barcode 72 on the vehicle 42, it is understood that other scannable information containing images, such as QR codes or the like, may also be used without departing from the spirit and scope of the present disclosure. The information scanned by the camera 18 may also be located on the dashboard or other locations on the vehicle. Furthermore, as noted above, the cable head 14 may be configured for plug connection into the diagnostic port of the vehicle to communicate with the ECU 66 for retrieval of vehicle identification information (e.g., an electronic VIN), as well as other diagnostic data (e.g., DTCs, live data, PID data, sensor data, etc.). The vehicle identification information may also be manually entered via the tool 10 or other device (e.g., a smartphone) capable of uploading the manually entered vehicle identification information to the tool 10 or remote server 44.

The communication circuit 56 may be configured to facilitate communication between the tool 10 and external devices, other than via the cable 40, such as communication with the user's smartphone 50, the remote diagnostic server 44, the remote parts store 46 or the remote repair shop 48. The communication circuit 56 may be capable of facilitating wireless communication via Bluetooth®, WiFi, a cellular communication network, etc.

The processor 52 may be configured to coordinate data communication within the tool 10 as well as execute functionalities of the tool 10, as described in more detail below. In this regard, the processor 52 may be in operative communication with the communication port 38, the communication circuit 56, the user input buttons 24-34 (e.g., a user interface, which may also include other inputs, such as a touch screen, a microphone capable of receiving voice commands, etc.), and the memory circuit 58.

The memory circuit 58 may include one or more databases stored thereon for quick and easy retrieval of information during use of the tool 10. Depending on the storage capacity and the processing capability of the tool 10, the memory circuit 58 may include only a relevant portion of the databases stored thereon, e.g., only those portions pertaining to the vehicle under test. For instance, if the tool 10 is intended for personal use, during initial setup, the tool 10 may be programmed for use with only the owner's vehicle(s), and thus, only the information associated with that vehicle(s) may be downloaded onto the tool 10. However, if the tool 10 is intended for commercial use, where it may interface with a number of different vehicles, the entirety of the database(s), or a comprehensive portion of the database(s), may be stored on the memory circuit 58. It is also contemplated that some or all of the database content used during operation of the tool 10 may be stored remotely and accessed through the communication circuit 56.

According to one embodiment, the symptomatic database 60 may include information that may be helpful in trying to identify a leak location on a particular vehicle 42 based on symptoms provided by the user. In this regard, symptom information provided by the user may be used to identify a possible fluid system 68, 70 that may be leaking. The symptom information may include the color of the leaking fluid (e.g., red, green, brown, black, etc.), the location of the leaking fluid (e.g., front, rear, passenger's side, driver's side), whether smoke or steam are visible, whether any unusual sounds are discernable, etc. The tool 10 may be able to use the symptomatic information to narrow down which fluid system 68, 70 may be leaking, and/or which portion of the vehicle 42 to start performing leak detection. Accordingly, the symptomatic database 60 may include a plurality of leak symptoms and associated leak locations matched with vehicle identification information. FIG. 4 shows an example of a symptomatic database 60. Once the vehicle identification information is acquired, the processor 52 may be configured to reference the symptomatic database 60 to identify the leak symptom(s) associated with the vehicle identification information. The referencing of the symptomatic database 60 may be performed autonomously (e.g., independent of user input) in response to the vehicle identification information being acquired. In this regard, the processor 52 may be configured to access and search the symptomatic database 60 to identify the leak symptoms associated with the acquired vehicle identification information in response to receipt of the vehicle identification information.

When symptom information is provided by the user, the processor 52 may be able to identify which fluid system 68, 70 is associated with the symptoms noted by the user. Accordingly, the instructions for testing that fluid system may be displayed or otherwise communicated to the user. The identification of the fluid system 68, 70 associated with the symptoms and the display of any related instructions for testing that fluid system may be performed autonomously in response to receipt of the symptom information provided by the user.

The instructions for testing the fluid system may be stored in an instructions database 62 that may include a plurality of leak detection instructions matched with fluid systems associated with vehicle identification information. Once the fluid system for a particular vehicle 42 is identified as the fluid system that is to be tested, the instructions associated with that fluid system can be communicated to the user. The process of identifying the instructions in the instructions database 62 and the subsequent communication of the identified instructions may proceed autonomously in response to identifying of the fluid system 68, 70, as discussed above. The instructions may be step-by-step instructions for accessing the fluid system and performing the test. The instructions may be vehicle-specific and include details unique to the fluid system under test. For instance, if it is determined that the transmission system should be tested, details for accessing the transmission system may be provided, such as how to pop the hood of the vehicle 42, where the transmission system is located relative to other components in the vehicle 42, where to insert dye into the transmission system, and where to guide the camera 18 when searching for the leak. The instructions may include images, pictures, flow charts, or other helpful information to more clearly and easily guide the user through the process.

When testing is being conducted and the user is guiding the camera 18 to capture images (e.g., pictures or videos) of the system under test, the captured images may be analyzed by an image analyzer 54 to detect leaking UV dye indicative of the presence of a leak, as well as to identify a location of the leak and any parts that may require repair or replacement. When the image analyzer 54 identifies a part(s) requiring replacement, the processor 52 may be configured to generate a part identification signal associated with the part requiring replacement for communication to the user. Leaking UV dye may illuminate, glow, or otherwise create a visually perceptible indication of the presence of a leak when the UV light is directed onto the dye. The image analyzer 54 may include or utilize the processor 52, or include a separate processor/hardware, as well as any software, algorithms, etc. (e.g., Artificial Intelligence), needed to implement the functions of detecting the leak and the location of the leak.

Analysis of the images captured by the camera 18 for leak presence and leak location may be performed autonomously in response to receipt of the images from the camera 18. In this regard, with the camera 18 being in communication with the image analyzer 54 via the processor 52, the camera 18 may be configured to communicate the captured image to the processor 52. Upon receipt of the image at the processor 52 from the camera 18, the processor 52 may be configured to automatically forward the captured image to the image analyzer 54 for UV detection analysis.

In one embodiment, the image analysis (e.g., detection of presence and location of the leak) may entail comparing the captured image with a stored image or engine layout information of the fluid system under test. As noted above, this comparison may be conducted autonomously in response to receipt of the image at the processor 52 or image analyzer 54. The stored image may be located in the vehicle image database 64, which may include several images matched with vehicle identification information. The images stored in the vehicle image database 64 may be engine layout information, photos, drawings, schematics, mechanical plans, etc. The content stored on the vehicle image database 64, e.g., images, engine layout information, etc., may indicate the size, shape, and relative location of engine components in sufficient detail to facilitate identification of specific components disposed within the field of view of the camera. Once the vehicle identification information is received, the fluid systems associated with the received vehicle identification information may be identified. Furthermore, once the particular system on the vehicle 42 is determined, the images for that system may be accessed and used to compare with the images received from the camera 18. Thus, if the user is leak testing a transmission fluid system for a 2014 HONDA ACCORD, the images captured during the test may be compared to stored images of the transmission fluid system for a 2014 HONDA ACCORD. Thus, if a leak is detected on the captured image (e.g., UV dye is detected), the location of the detected dye may be determined by comparing the location of the dye to the image to identify a part(s) in the location of the dye.

In addition to the autonomous feature noted above, identification of the parts requiring replacement may be done autonomously (e.g., without user input) in response to identifying presence and location of the leak. The identification of the specific part may be facilitated through the comparison of the captured image with the stored image, as described in more detail above. In this regard, the autonomous functionalities described herein may include a single step in the overall process, or several steps in the process. For instance, in one embodiment, the system may be capable of identifying the presence of a leak, identifying the location of the leak, identifying a part associated with the leak, and identifying a specific replacement part associated with the leak, all of the foregoing steps being completed autonomously in response to capturing of the image by the camera, and with the vehicle identification information already having been received. The autonomous features may minimize the effort or input required by the user. For instance, when trying to identify the system/part associated with a leak, in a system lacking autonomous capabilities, the user may be required to go back and forth between the area on the vehicle where the leak is present (e.g., the engine compartment) and a computer which may display engine layouts. In such a non-autonomous system, the user may conduct a visual comparison between the area in which the leak is physically present, and the engine layout depicted on the computer to try and determine the precise location of the leak, as well as the system/part associated with the leak. Furthermore, once the system/part is identified, the user may perform a separate step of accessing a parts store database to try and find the replacement part needed for the user's specific vehicle. These user-performed steps may lead to inaccurate results, such as the user identifying the wrong part, as well as a very tedious, time-consuming process. In contrast, the autonomous functionalities simplify the process by minimizing the effort and input required by the user, which in turn, may mitigate user-related errors. For instance, the autonomous system may enable identification of the presence of the leak, identification of location of the leak, identification of the part/system requiring replacement, identification of a universal part number associated with the part/system requiring replacement, and ordering of the part, with all of those steps being completed in response to the user simply capturing an image of the area of the vehicle where the leak is suspected.

It is contemplated that if a leak is detected, the system may be configured to generate an alert to the user indicative of the presence of the leak. This alert may be generated autonomously, and include a visual notification, either on the tool 10 or the user's smartphone 50, or an audible notification by a speaker on the tool 10 or smartphone 50. If the particular part requiring replacement has been identified, the alert may also include identification of that part.

In one embodiment, the particular part needing replacement may be associated with a universal part number, such as an Aftermarket Catalog Exchange Standard (ACES) part number, which may be useful in identifying and purchasing the replacement part needed for the user's particular vehicle from a parts store. In order to facilitate procurement of the replacement part, the part identification signal may be communicated to the tool, the user's smartphone, or another electronic device, to access a parts store to enable purchase of the part requiring replacement.

The processor 52, symptomatic database 58, instructions database 62, image database 64, and the image analyzer 54, either in whole or in part, may be located in the remote server 44. Thus, to the extent resources are located in the remote server 44, the tool 10 may be less sophisticated and thus, less costly. In other words, resources in the remote server 44 may be used by multiple tools 10, rather than requiring such resources to be included in each tool 10.

During use of the tool 10, a user may first acquire the vehicle identification information from the vehicle, by scanning the barcode 72 with the camera 18, or plugging the cable head 14 into the diagnostic port on the vehicle 42 to facilitate retrieval of vehicle identification information (e.g., an electronic VIN) from the ECU 66 (e.g., onboard vehicle computer). Alternatively, the vehicle identification information may be entered through a user interface on the tool 10, or via an app executable on the user's smartphone 50, which may be in communication with the tool 10. The received vehicle identification information may be used to identify vehicle-specific diagnostic information, such as fluid systems 68, 70 on the vehicle 42, images of those fluid systems, possible symptoms that may be noticeable to the user, query on-board systems gathering heating, ventilation, and air-conditioning (HVAC) related operational data (e.g., vehicle diagnostic data), as well as step-by-step instructions for conducing leak testing for the particular systems on the vehicle. The vehicle diagnostic data retrieved and used in the process of leak detection may be acquired via connection of the cable head 14 to the diagnostic port on the vehicle 42 and communication with ch ECU 66.

Based on the information and data acquired by the tool 10, the tool 10 may identify possible symptoms that may be noticeable by the user to try and narrow in on where a possible leak may be occurring. For instance, certain symptoms may not apply to some vehicles, as they may not have certain fluid systems on the vehicle, e.g., some vehicles may not include an air conditioner, and thus, may not include an air conditioning system. Accordingly, symptoms associated with a possible leak in the air conditioner may not be displayed when testing those vehicles. The symptoms that are displayed may be arranged or ranked based on a predetermined ranking scheme. In one scheme, the ranking may be based on likely leaks as determined by an analysis of vehicle diagnostic data, where symptoms associated with likely leaks may be displayed first, and symptoms associated with unlikely leaks may be displayed last. In another scheme, the ranking may be based on historical data from the same or similar vehicles. For instance, the symptoms associated with the most common leaks for the same or similar vehicles may be displayed first, while the symptoms associated with the leaks common leaks for the same or similar vehicles may be displayed last. Other ranking schemes known in the art may also be used without departing from the spirit and scope of the present disclosure.

Irrespective of the ranking scheme that may be used, the symptomatic information provided by the user may help in identifying the location of the possible leak. Examples of the symptomatic information may include the color of the leaking fluid (e.g., reddish color may be an indication of leaking transmission fluid, a greenish color may be an indication of leaking refrigerant, brownish/blackish color may be an indication of leaking oil, etc.), as well as the location of the leak (e.g., leak on front of the vehicle, leak on back of the vehicle, leak on the middle of the vehicle, leak on driver's side, leak on passenger side).

Identifying a fluid system to initially test may be based on the symptom(s) identified by the user, or alternatively, if no symptoms can be identified, a ranking of common fluid leaks associated with that particular vehicle may be used to prioritize which system is tested first.

Once a fluid system has been identified, the tool 10 may provide vehicle-specific, step-by-step instructions which guides the user through the testing process. In particular, images, diagrams, and explanations may be displayed or audibly emitted from the tool 10 as guidance. The process may entail inserting a particular UV dye into the fluid system under test. The user may then aim the cable head 14 along the fluid system to detect any leaking UV dye. The cable head may be actuated such that the UV light is emitted from the cable head via the UV light source 16 and the camera 18 captures images or videos as the cable head 14 is moved over the fluid system. When a leak is present, the UV dye will be illuminated by the UV light and captured by the camera 18 against a darker background to provide a desired visual contrast.

The image(s) captured by the camera 18 may be sent to the image analyzer 54 to analyze the image to determine whether dye has been detected. In this regard, the detection of the dye may be performed through a digital analysis of the image, rather than by the human user, based on a comparison of the contrast between the dye and the adjacent structure captured in the image.

The image analyzer 54 may also be capable of determining the location of fluid system captured in the image by comparing the captured image with a known image of the fluid system. In this regard, the image may provide specific configurations of fluid system components, and/or adjacent structures or components on the vehicle, which may be used by the image analyzer to identify the location of the components captured in the image. Thus, if a leak is detected, the image analyzer will not only be able to note the presence of the leak, but will al so be able to detect the precise location of the leak, as well as the component(s) that require replacement to fix the leak.

The system may be capable of facilitating purchasing of the replacement parts and associated repair services by linking the customer directly to a parts store 46 and/or repair shop 48. Thus, the repair can be initiated without requiring the user to identify the particular part needing replacement.

If a leak is detected, the tool 10 may provide a visual alert, an audible alert, or generate a text message that can be sent to the user.

The particulars shown herein are by way of example only for purposes of illustrative discussion, and are not presented in the cause of providing what is believed to be most useful and readily understood description of the principles and conceptual aspects of the various embodiments of the present disclosure. In this regard, no attempt is made to show any more detail than is necessary for a fundamental understanding of the different features of the various embodiments, the description taken with the drawings making apparent to those skilled in the art how these may be implemented in practice.

What is claimed is:

1. A leak detection system configured to provide vehicle-specific leak detection for a vehicle under test, the leak detection system comprising:
   a handholdable tool configured to receive a data packet generated by an electronic system on the vehicle under test, the data packet including vehicle identifying information;
   a handholdable ultraviolet light source in communication with the tool and separate from the vehicle to enable selective positioning of the ultraviolet light source relative to the vehicle;
   a handholdable camera in communication with the tool and configured to capture an image of an area illuminated by the ultraviolet light source wherein a fluid leak is present, the handholdable camera being separate from the vehicle to enable selective positioning of the camera relative to the vehicle, the handholdable camera being coupled to the ultraviolet light source in a manner which enables concurrent movement of the ultraviolet light source and the camera; and a processor in communication with the camera and configured to receive the data packet, the processor being further configured to:
 derive the arrangement of components on the vehicle under test based on the vehicle identifying information;
 analyze the image captured by the camera to identify components of the vehicle under test proximate the area captured in the area illuminated by the ultraviolet light source; and
 compare the image captured by the camera to the arrangement of components on the vehicle under test to determine a most likely component that is a source of the detected leak.

2. The leak detection system recited in claim 1, wherein the processor is configured to implement the analyzing and the comparing autonomously in response to receipt of the image and the data packet.

3. The leak detection system recited in claim 1, wherein the received data packet includes diagnostic data and the processor is configured to identify a possible source of the leak based on the received diagnostic data.

4. The leak detection system recited in claim 1, wherein the leak detection system further comprising a memory circuit in operative communication with the tool, the memory circuit having a plurality of user-implementable leak detecting steps, the user implementable leak detection steps being associated with vehicle identifying information, the processor further being configured to identify at least one of the plurality of user-implementable leak detecting steps associated with the vehicle identifying information from the vehicle under test.

5. The leak detection system recited in claim 4, wherein the processor is configured to facilitate identification of at least one of the plurality of user-implementable leak detecting steps associated with the vehicle under test autonomously in response to receipt of the vehicle identifying information associated with the vehicle.

6. The leak detection system recited in claim 4, wherein the memory circuit and the processor are included, at least in part within the tool.

7. The leak detection system recited in claim 4, wherein the memory circuit and the processor are disposed within the tool.

8. The leak detection system recited in claim 1, wherein the processor is further configured to generate part identification information associated with the most likely component that is the source of the detected leak for communication to the user.

9. The leak detection system recited in claim 8, wherein the part identification information is generated autonomously in response to determination of the most likely component that is the source of the detected leak.

10. The leak detection system recited in claim 8, wherein the part identification information is generated autonomously in response to receipt of the image and the data packet at the processor.

11. The leak detection system recited in claim 1, wherein the processor is further configured to facilitate placement of an order for the most likely component that is the source of the detected leak autonomously in response to receipt of the image and the vehicle identification information at the processor.

12. The leak detection system recited in claim 1, further comprising a vehicle image database operatively communicable with the processor and having a plurality of vehicle images with associated vehicle identifying information, the processor being configured to identify at least one of the plurality of vehicle images associated with the vehicle under test based on comparison of the image captured by the camera with the plurality of vehicle images in the vehicle images database.

13. The leak detection system recited in claim 12, wherein the vehicle image database is disposed, at least in part, within the tool.

14. The leak detection system recited in claim 1, wherein the processor is configured to generate a vehicle identification signal associated with received data packet, the vehicle identification signal being communicable to a remote server including a vehicle image database thereon having a plurality of vehicle images associated with vehicle identifying information.

15. The leak detection system recited in claim 1, further comprising a cable connectable to the handheld tool, the cable including the camera and the ultraviolet light source.

16. The leak detection system recited in claim 15, wherein the cable includes an end portion connectable to a diagnostic port on the vehicle under test to facilitate data communication between the tool and the vehicle.

17. The leak detection system recited in claim 1, wherein the tool is configured to wirelessly receive the data packet from the vehicle under test.

18. The leak detection system as recited in claim 1, wherein the processor is further configured to identify vehicle components disposed proximate the area illuminated by the ultraviolet light source that transport fluid.

19. The leak detection system as recited in claim 18 wherein the processor is further configured to identify the type of fluid illuminated by the ultraviolet light source.

20. The leak detection system as recited in claim 19 wherein the processor is further configured to identify vehicle components disposed proximate the area illuminated by the ultraviolet light source that transport the identified type of fluid.

21. The leak detection system as recited in claim 1, wherein the processor is configured to identify a possible source of the leak based on the received data packet from the electronic system on the vehicle under test.

22. The leak detection system recited in claim 1, wherein the processor is configured to identify a plurality of possible sources of the leak based on the received data packet from the electronic system on the vehicle under test and rank the possible sources of the leak based on a predetermined ranking scheme.

23. A method of vehicle-specific leak detection for a vehicle under test, the method comprising the steps of:
 receiving a data packet from the vehicle under test, the data packet including vehicle identifying information being used in identifying characteristics of the vehicle under test;
 deriving the arrangement of components on the vehicle under test based on the vehicle identifying information;
 receiving an image of an area illuminated by a handholdable ultraviolet light source;
 analyzing the received image to identify a components of the vehicle under test proximate the area captured in the area illuminated by the ultraviolet light source; and
 comparing the received image to the arrangement of components on the vehicle under test to determine a most likely component that is a source of the detected leak.

24. The method recited in claim 23, further comprising the steps of:
identifying a possible source of a leak based on the received data packet from the vehicle under test;
identifying at least one of a plurality of user-implementable leak detecting steps based on the possible source of the leak; and
generating a signal including the identified at least one of the plurality of user-implementable leak detecting steps.

25. The method recited in claim 23, wherein the steps of receiving the data packet, receiving the image, and analyzing the received image are performed, at least in part, within a hand-holdable housing.

26. The method recited in claim 23, the method further comprising the step of using the received vehicle identifying information to identify a possible source of the leak or to identify the at least one of the plurality of user-implementable leak detecting steps.

27. The method recited in claim 23, further comprising the steps of receiving vehicle identifying information associated with the vehicle under test via user input from a user and using the received vehicle identifying information to identify a possible source of the leak or to identify the at least one of a plurality of user-implementable leak detecting steps.

28. The method recited in claim 23, further comprising the step of generating a visual display including at least one of a plurality of user-implementable leak detecting steps.

29. The method recited in claim 23, further comprising the step of emitting an ultraviolet light to facilitate detection of a possible leak.

30. The method recited in claim 23, further comprising the step of receiving symptomatic leak data from a user.

31. The method recited in claim 30, further comprising the step of comparing the received symptomatic leak data to stored leak symptoms to identify a possible leak.

32. The method recited in claim 23, further comprising the step of displaying the received image.

33. The method recited in claim 23, wherein the analyzing and comparing steps are performed autonomously in response to receipt of the image.

34. The method recited in claim 23, further comprising the step of generating of a purchase order for the most likely component that is the source of the detected leak.

35. The method recited in claim 23, wherein the processor is further comprising the step of identifying vehicle components disposed proximate the area illuminated by the ultraviolet light source that transport fluid.

36. The method recited in claim 35 further comprising the step of identifying the type of fluid illuminated by the ultraviolet light source.

37. The method recited in claim 36 further comprising the step of identifying vehicle components disposed proximate the area illuminated by the ultraviolet light source that transport the identified type of fluid.

38. A non-transitory computer readable medium storing computer executable instructions for use in providing vehicle-specific leak detection for a vehicle under test, the computer readable medium configured for use with a camera configured to capture an image of an area illuminated by an ultraviolet light source, the computer executable instructions being downloadable onto a mobile communication device for configuring the mobile communication device to:
derive an arrangement of components on the vehicle under test based on vehicle identifying information received in a data packet generated by an electronic system on the vehicle under test;
analyze the image captured by the camera to identify components of the vehicle under test proximate the area captured in the area illuminated by the ultraviolet light source; and
compare the image captured by the camera to the arrangement of components on the vehicle under test to determine a most likely component that is a source of the detected leak.

39. The computer readable medium recited in claim 38, wherein the computer executable instructions further configure the mobile communication device to:
identify a possible source of a leak based on the data packet associated with the vehicle under test; and
facilitate identification of at least one of the plurality of user-implementable leak detecting steps in a memory circuit based on the received data packet.

40. The computer readable medium recited in claim 38, wherein the computer executable instructions further configure the mobile communication device to identify vehicle components disposed proximate the area illuminated by the ultraviolet light source that transport fluid.

41. The computer readable medium recited in claim 40, wherein the computer executable instructions further configure the mobile communication to identify the type of fluid illuminated by the ultraviolet light source.

42. The computer readable medium recited in claim 41, wherein the computer executable instructions further configure the mobile communication device to identify vehicle components disposed proximate the area illuminated by the ultraviolet light source that transport the identified type of fluid.

* * * * *